July 29, 1958  C. R. NICKOLS  2,845,089
VALVES
Original Filed Jan. 27, 1954
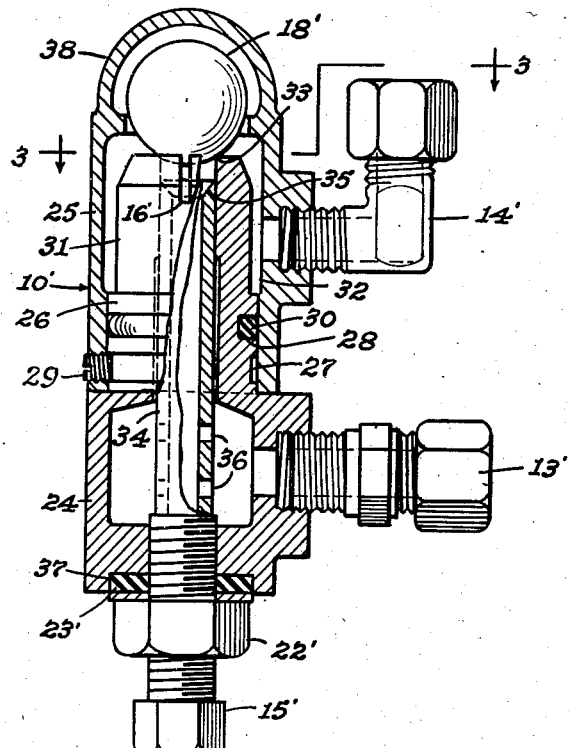
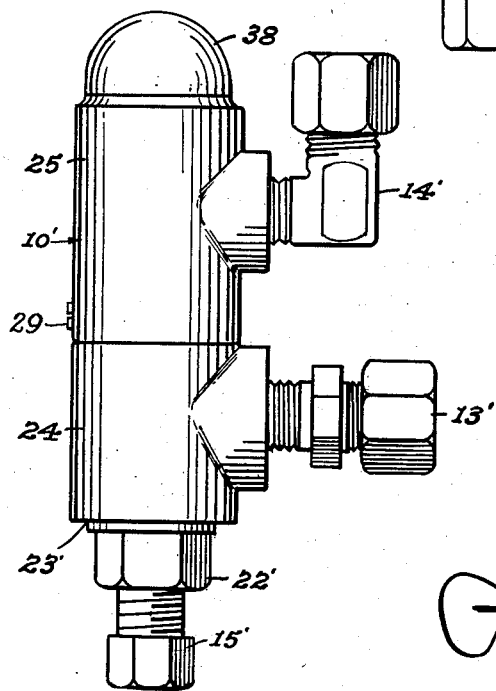
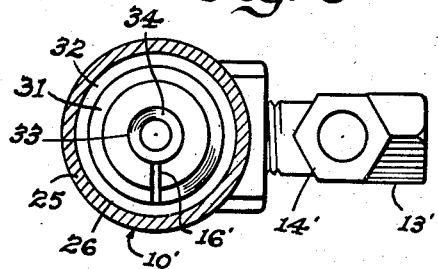
Inventor
Chester R. Nickols

United States Patent Office 2,845,089
Patented July 29, 1958

2,845,089

VALVES

Chester R. Nickols, Sycamore, Ill., assignor to Elgin Softener Corporation, Elgin, Ill., a corporation of Illinois Original application January 27, 1954, Serial No. 406,419. Divided and this application March 12, 1954, Serial No. 415,764

8 Claims. (Cl. 137—513.5)

This application is a division of my copending application, Serial No. 406,419, filed January 27, 1954

This invention relates to valves and more particularly a nonstop leak or bleeder valve especially designed and adapted for use as a rinse control valve for an automatic or semiautomatic water softener to time the rinse period by relating it to the time it takes to refill the brine compartment, thereby insuring the passing of an adequate amount of rinse water through the water softener regardless of such variations in water pressure as are bound to occur, inasmuch as the change in water pressure will, of course, affect the refill operation proportionately. This calls for an accurately adjustable, non-clogging type of leak or bleeder valve, which it is the principal object of my present invention to provide in a simple and economical form.

The invention is illustrated in the accompanying drawings in which—

Fig. 1 is a longitudinal section through a rinse control valve made in accordance with my invention;

Fig. 2 is a side view of the valve, and

Fig. 3 is a cross-section on the line 3—3 of Fig. 1.

The same reference numerals are applied to corresponding parts throughout these views.

Referring to the drawing, the rinse control valve 10' is connected at 13' with a pipe leading downwardly to the brine tank of a water softener for drawing brine therefrom and subsequently delivering raw water thereto for the production of the next charge of brine, another pipe being connected at 14' leading to the multiple valve that establishes different systems of communication between the water softener, brine tank, a source of raw water supply, a service system, and a drain, in the softening operation, and the several steps of regeneration, namely, backwash, brining and rinsing. It will suffice for the present purposes to state that in the "salt draw" or "brining" position of said multiple valve, brine flows upwardly through the pipe to connection 13' into valve 10' and out through the pipe connected at 14', and then in the next position of said multiple valve, namely, the "rinse" position, raw water is delivered at 14' to valve 10' and flows downwardly through the pipe connected at 13' to the brine compartment to refill it, and, whereas the brine flow first described is unrestricted, the refill flow last mentioned is restricted almost to a trickle in relation to the rinse flow that is going on through the softener at the time, in order to prolong the rinse to the extent required for good and adequate rinsing of the bed in the softener, the rinse period being timed, as disclosed in my Patent No. 2,799,294, issued July 16, 1957, by relating it to the time it takes to refill the brine compartment, thereby insuring the passing of an adequate amount of rinse water through the softener regardless of such variations in water pressure as are bound to occur, inasmuch as any change in water pressure will, of course, affect the refill operation proportionately. The timing involves the adjustment of a screw 15' to restrict the flow through a bleeder opening or openings 16' provided below the ball check-valve 18' cooperating with the seat 33. The check-valve unseats to allow unrestricted outflow of brine through the valve 10' from 13' to 14' during salt draw or brining but closes under pressure of raw water flowing in the opposite direction to restrict the flow for refill purposes, the refill flow rate being determined by the accurate adjustment of screw 15'. Thus, since the valve 18' unseats each time the flow is from 13' to 14', any foreign matter such as grit from the nonsoluble portions of the salt, and any dirt or sediment that might have collected between the check-valve 18' and the slots 16' will be cleared out by the brine flow. A lock nut 22' serves the double purpose of locking the screw 15' in adjusted position and compressing a rubber gasket ring 37 to prevent leakage.

In other words, the valve 10' allows unrestricted flow of brine upwardly therethrough, namely, from the pipe connection 13' to the pipe connection 14' but only a very restricted flow in the opposite direction, namely, in the refilling of the brine tank or compartment. This valve 10' comprises a main body part 24 on which another body part 25 is swivelled to permit making the pipe connections at 13' and 14' in longitudinal planes in whatever angular relationship to one another is desired. The tubular extension 26 of body part 24 has annular grooves 27 and 28 provided therein, and a set-screw 29 threaded in the body part 25 engages in groove 27 to fasten the body parts in any desired adjusted swivelled relationship, while a compressible resilient O-ring 30 is seated in groove 28 and compressed by engagement with the walls of body part 25 to prevent leakage. The upper end portion 31 of the tubular portion 26 is reduced, whereby to provide a sediment collecting chamber 32 in the body part 25 below the upper end of the reduced portion 31, where a valve seat 33 is provided for engagement by the ball check-valve 18'. A narrow elongated metering slot or port 16' is provided in the upper end of the reduced portion 31, and a metering valve or quill 34 working inside the tubular portion 26 is provided as an integral part of the adjusting screw 15' for adjustment lengthwise of port 16' for fine adjustment of the refill flow. The upper end of the bore of the quill 34 is chamfered, as indicated at 35, to provide operating clearance for the ball 18' in the event of too close adjustment. Radial ports 36 in the lower portion of the quill allow unrestricted flow of brine through the quill in one direction and refill water in the other direction. A compressible resilient gasket 23' seats in a recess 37 in the lower portion of the body part 24 and is compressed by the tightening of a lock-nut 22' to hold the quill 34 in adjusted position and at the same time prevent leakage from the valve 10'. The hollow semi-spherical reduced upper end portion 38 of the body part 25 serves as a cage or retainer for the ball 18' allowing the ball to move far enough off the seat 33 during brine flow so that there is no restriction to such flow.

The provision of chamber 32 for the collection of any solids during the slow refill flow reduces likelihood of clogging port 16', and any particles settling in chamber 32 are certain to be flushed out when the flow is reversed for salt draw or brining. Also, this construction makes for accuracy in and permits fine adjustment of the refill flow. The freedom from clogging and the improved adjustment together account for the good all-around performance of this valve.

It is believed the foregoing description conveys a good understanding of the objects and advantages of my invention. The appended claims have been drawn to cover all legitimate modifications and adaptations.

I claim:

1. A check valve structure comprising a body having a tubular portion terminating in a valve seat, a check valve element arranged to engage the seat when fluid flows in one direction through the body, said tubular portion having an elongated metering slot provided therein longitudinally thereof opening inwardly from the valve seat, whereby said check valve element when seated closes the open end of said slot, and a tube adjustable in telescoping relation to said tubular portion so that its one end moves lengthwise relative to the inner end of said slot to close more or less of the length thereof.

2. A check valve structure comprising a body having a tubular portion terminating in a valve seat, a check valve element arranged to engage the seat when fluid flows in one direction through the body, said tubular portion extending upwardly in laterally spaced relation to the side walls of a sediment chamber provided in said body and having an elongated metering slot provided therein longitudinally thereof opening inwardly from the valve seat, whereby said check valve element when seated closes the open end of said slot, and a tube adjustable in telescoping relation to said tubular portion so that its one end moves lengthwise relative to the inner end of said slot to close more or less of the length thereof.

3. A check valve structure comprising a body having a tubular portion terminating in a valve seat, a ball check valve arranged to engage the seat when fluid flows in one direction through the body, said tubular portion having an elongated metering slot provided therein longitudinally thereof opening inwardly from the valve seat, whereby said ball check valve when seated closes the open end of said slot, and a tube slidably adjustable with a close fit inside said tubular portion so that its one end moves lengthwise relative to the inner end of said slot to cover more or less of the length thereof, said tube having said end chamfered internally to afford clearance for the ball check valve when said end is adjusted to close proximity to said ball.

4. A check valve structure comprising a body having a tubular portion terminating in a valve seat, a ball check valve arranged to engage the seat when fluid flows in one direction through the body, said tubular portion extending upwardly in laterally spaced relation to the side walls of a sediment chamber provided in said body and having an elongated metering slot provided therein longitudinally thereof opening inwardly from the valve seat, whereby said ball check valve when seated closes the open end of said slot, and a tube slidably adjustable with a close fit inside said tubular portion so that its one end moves lengthwise relative to the inner end of said slot to cover more or less of the length thereof, said tube having said end chamfered internally to afford clearance for the ball check valve when said end is adjusted to close proximity to said ball.

5. A check valve structure comprising two interconnected hollow body parts whose connected male and female portions are assembled in swivelled relationship permitting disposition of inlet and outlet fittings radially connected to said parts at any desired angle with respect to one another for widened adaptability of the structure, the male portion on one of said body parts being of elongated tubular form having a bore longitudinally thereof and a valve seat at the outer end of said bore, a check valve element arranged to engage said valve seat when fluid flows in one direction through the bore, said male portion having an elongated metering slot provided therein longitudinally thereof communicating with the bore and opening inwardly away from said valve seat, whereby to allow fluid to bypass said check valve when seated, and a tubular member adjustable endwise in the bore in said male portion so that its one end is adjustable along said slot and accordingly regulates the bypass flow therethrough.

6. A check valve structure as set forth in claim 5, wherein said tubular member extends through and communicates with the body part having said male portion and is threadedly adjustable in an opening provided in said body part in remote relation to said male portion, which opening is axially aligned with the bore in said male portion, whereby said tubular member is adjustable from outside said structure.

7. A check valve structure as set forth in claim 5, wherein said body part having the female portion is formed internally to provide a sediment collecting chamber below and remote from said valve seat and metering slot.

8. A check valve structure as set forth in claim 5, wherein the male portion has two annular grooves provided therein into one of which grooves the inner end of a set screw threaded in the female portion is engaged to prevent disassembling of the body parts and fasten them releasably in swivelled adjusted relation, and in the other of which grooves is disposed a compressible resilient O ring which is compressed in the assembly of the body parts to prevent leakage while permitting swivel adjustment of said body parts relative to one another.

References Cited in the file of this patent

UNITED STATES PATENTS

| | | |
|---|---|---|
| 412,651 | McElroy | Oct. 8, 1889 |
| 753,999 | Mosher | Mar. 8, 1904 |
| 796,985 | Brown | Aug. 15, 1905 |
| 1,852,717 | Grinnell | Apr. 5, 1932 |
| 1,890,494 | Borden | Dec. 13, 1932 |
| 2,601,968 | Danielson | July 1, 1952 |
| 2,703,582 | Stepanian | Mar. 8, 1955 |